United States Patent [19]

Witt et al.

[11] Patent Number: 5,444,132
[45] Date of Patent: Aug. 22, 1995

[54] CONTROLLED ADDITION OF ALKALI OR ALKALINE EARTH SALTS TO A CHROMIUM OXIDE CATALYST

[75] Inventors: Donald R. Witt; Elizabeth A. Benham; Max P. McDaniel, all of Bartlesville, Okla.

[73] Assignee: Phillips Petroleum Company, Bartlesville, Okla.

[21] Appl. No.: 162,231

[22] Filed: Dec. 6, 1993

Related U.S. Application Data

[60] Division of Ser. No. 69,695, Jun. 1, 1993, Pat. No. 5,284,811, which is a continuation of Ser. No. 804,631, Dec. 9, 1991, abandoned, which is a continuation of Ser. No. 522,683, May 14, 1990, abandoned.

[51] Int. Cl.$^6$ ................................ G08F 4/24
[52] U.S. Cl. ........................ 526/106; 526/123
[58] Field of Search ........................ 526/106, 123

[56] References Cited

U.S. PATENT DOCUMENTS

| | | | |
|---|---|---|---|
| 2,725,374 | 11/1955 | Mosher | 260/94.9 |
| 3,544,534 | 12/1970 | Kadowaki et al. | 526/98 |
| 3,715,321 | 2/1973 | Horvath | 252/441 |
| 3,875,079 | 4/1979 | Witt | 252/451 |
| 3,887,494 | 6/1975 | Dietz | 252/452 |
| 4,364,842 | 12/1982 | McDaniel et al. | 252/430 |
| 4,364,854 | 12/1982 | McDaniel et al. | 252/437 |
| 4,384,987 | 5/1983 | Hawley | 252/458 |
| 4,436,882 | 3/1984 | Witt | 526/106 |
| 4,565,802 | 1/1986 | Young | 502/214 |
| 4,619,980 | 10/1986 | McDaniel et al. | 526/96 |

Primary Examiner—Joseph L. Schofer
Assistant Examiner—Tom Weber
Attorney, Agent, or Firm—Dougherty, Hessin, Beavers & Gilbert

[57] ABSTRACT

An improved supported chromium oxide catalyst, a process for preparing the catalyst and a process for polymerizing olefin monomers utilizing the catalyst are provided. In accordance with the preparation process, chromium oxide and a support containing one or more of silica, titania, thoria, alumina, zirconia or aluminophosphates are combined, impregnated with a metal salt and activated. The metal salt is selected from the group consisting of alkali metal salts, alkaline earth metal salts and mixtures thereof.

16 Claims, No Drawings

CONTROLLED ADDITION OF ALKALI OR ALKALINE EARTH SALTS TO A CHROMIUM OXIDE CATALYST

This is a divisional of application(s) Ser. No. 08/069,695 filed Jun. 1, 1993 now U.S. Pat. No. 5,284,811 which is a cont. of 07/804,631 filed Dec. 9, 1991 now abandoned, which is a cont. of 07/522,683 filed May 14, 1990 now abandoned.

BACKGROUND OF THE INVENTION

1. Field of the Invention

This invention relates to supported chromium oxide polymerization catalysts, processes for preparing such catalysts and olefin polymerization processes utilizing the catalysts.

2. Description of the Prior Art

It is well known that olefin polymers can be prepared using supported chromium oxide catalysts. The polymerization reactions can be carried out in hydrocarbon solutions in which the polymers are soluble or in diluents in which the polymers are insoluble whereby slurries of suspended solid polymer particles are produced. In such polymerization processes, the melt indexes of the polymers can be varied by varying the polymerization temperatures, i.e., higher reaction temperatures generally result in increased melt indexes. However, in slurry polymerization processes, the reaction temperatures which can be utilized are limited in that at higher temperatures the polymers become swollen and sticky.

Other techniques are known in the art which bring about the production of polymers of higher melt indexes in slurry polymerization processes without increasing the reaction temperatures above normal limits. For example, U.S. Pat. No. 4,384,987 to Hawley discloses a polymerization catalyst comprised of supported chromium oxide which is prepared by a process including the step of treating the catalyst with a permanganate compound. The use of such a catalyst in slurry polymerization processes results in polymers having higher melt indexes.

Supported chromium oxide catalysts have heretofore been comprised of chromium oxide and supports containing one or more of silica, titania, thoria, alumina, zirconia or aluminophosphates. The catalysts are prepared by combining the chromium oxide and the support in a known manner and then activating the catalyst. By the present invention improved supported chromium oxide catalysts and processes for preparing and using such catalysts are provided. The improved catalysts have increased polymerization activities and result in polymers of high melt indexes.

SUMMARY OF THE INVENTION

In accordance with the present invention, improved polymerization catalysts comprised of chromium oxide and supports containing one or more of silica, titania, thoria, alumina, zirconia or aluminophosphates are provided. A catalyst of the invention is prepared by first combining chromium oxide and the support utilized in a known manner. The catalyst produced is then impregnated with a metal salt selected from the group consisting of alkali metal salts, alkaline earth metal salts and mixtures thereof and activated. The resulting catalyst has increased polymerization activity and polymers of increased melt indexes can be produced using the catalyst.

The impregnation step of the present invention preferably comprises mixing the catalyst with a non-aqueous solution of the metal salt or salts utilized followed by removing the non-aqueous solvent from the mixture.

In another aspect of the invention, processes for polymerizing at least one olefin monomer using the improved catalysts are provided. In a preferred polymerization process, the activated metal salt impregnated catalyst is reduced by contact with carbon monoxide and used with a cocatalyst, i.e., a trialkyl aluminum compound in the presence of hydrogen. Copolymers produced, e.g., ethylenehexene copolymers, have low density and high comonomer incorporation efficiency.

It is, therefore, a general object of the present invention to provide improved polymerization catalysts and processes for making and using such catalysts.

A further object of the present invention is the provision of improved supported chromium oxide polymerization catalysts having increased activities which can be used to produce olefin polymers having increased melt indexes.

Other and further objects, features and advantages of the present invention will be readily apparent to those skilled in the art upon a reading of the description of preferred embodiments which follows.

DESCRIPTION OF PREFERRED EMBODIMENTS

In accordance with the present invention, an olefin polymerization catalyst comprised of chromium oxide and a support containing one or more of silica, titania, thoria, alumina, zirconia or aluminophosphates is prepared by a process including the steps of impregnating the catalyst with one or more alkali or alkaline earth metal salts and activating the salt impregnated catalyst. The resulting catalyst has improved activity and produces a polymer of increased melt index. Melt index is a measure of the viscosity of a polymer at a specified temperature and pressure, and is a function of the molecular weight of the polymer. As referred to herein, Melt Index (MI) and High Load Melt Index (HLMI) are those values determined in accordance with ASTM 1238-65T, conditions E and F, respectively.

A variety of processes and techniques have been developed for producing various supported chromium oxide catalysts useful in olefin polymerization reactions. Such supported chromium oxide catalysts can include silica supports which contain silica admixed with one or more metal compounds of titania, thoria, alumina and/or zirconia. Silica supports are described, for example, in U.S. Pat. No. 3,875,079 to Witt which is incorporated herein by reference. Silica-titania supports on which is dispersed chromium oxide or a chromium compound convertible to chromium oxide by oxidation are described for example, in U.S. Pat. No. 4,151,122, issued to McDaniel et al., also incorporated herein by reference. The catalysts produced are activated by a reduction-reoxidation process.

Silica supports employed in supported chromium oxide catalysts can be produced, with or without the metal compounds mentioned above, by introducing an aqueous solution of an alkali metal silicate into an aqueous solution of an acid, either of the solutions optionally containing one or more of the above mentioned metal compounds, aging the hydrogel which forms, washing the hydrogel to reduce the alkali metal content thereof to a minimum, separating the water from the hydrogel to form a xerogel and using the xerogel comprising silica as the chromium oxide support. That is, the xerogel is combined with an anhydrous chromium containing compound and the resulting catalyst is activated.

Supported chromium oxide olefin polymerization catalysts can also be comprised of chromium oxide supported on aluminophosphate supports. Such catalysts are generally used in conjunction with a boron component, either as a part of the support or as a cocatalyst, e.g., a triethylborane cocatalyst. An aluminophosphate supported catalyst is described in U.S. Pat. No. 4,364,842 to McDaniel et al. which is incorporated herein by reference. Various methods can be used to prepare the aluminophosphate base. For example, an aluminum salt can be combined with a source of phosphate ions in an aqueous medium and neutralized with a neutralizing agent to give a hydrogel. Chromium can be co-precipitated or added to the hydrogel. After water is removed from the hydrogel, the resulting chromium-containing xerogel is activated by heating in air.

In accordance with the present invention, a supported chromium oxide catalyst of one of the types described above is treated whereby it is impregnated with a metal salt selected from the group consisting of alkali metal salts, alkaline earth metal salts and mixtures thereof. After such metal salt impregnation, the catalyst is activated. While any alkali metal or alkaline earth metal salt or hydroxide or mixture of such salts or hydroxides can be utilized, alkali metal salts or hydroxides are preferred, with lithium and sodium formates, acetates and hydroxides being the most preferred. The term "salt(s)" is used hereinafter to mean both salts and/or hydroxides.

A particularly suitable technique for impregnating the supported catalyst with the metal salt or salts utilized comprises mixing the catalyst with a solution of the salt or salts and then removing the solvent from the mixture. While the solvent can be aqueous or non-aqueous, a non-aqueous solvent is preferred in that the porosity of the support is protected from the high surface tension of water. Of the various non-aqueous solvents which can be utilized, alcohols are preferred with methanol being the most preferred.

In a preferred preparation process of this invention, a silica-titania supported chromium oxide catalyst of one of the types described above is prepared and calcined at a temperature in the range of from about 400° C. to about 600° C. The catalyst is then combined with a methanol solution of a lithium or sodium formate, acetate or hydroxide, or a mixture of such salts, and the resulting mixture is stirred at a temperature in the range of from about 25° C. to about 70° C. for a time period in the range of from about 5 minutes to about 60 minutes. The methanol solvent is then removed from the mixture by evaporation followed by the calcination of the treated catalyst in air at a temperature in the range of from about 500° C. to about 700° C.

The quantity of metal salt or salts utilized in the non-aqueous solution thereof is such that the catalyst is impregnated with the salt or salts in an amount of from about 50 to about 500 micromoles per gram of the catalyst, preferably from about 100 to about 400 micromoles per gram and most preferably from about 150 to about 250 micromoles per gram. Generally, the quantity of metal salt or salts required for impregnating the catalyst needs to be increased in the non-aqueous solution only slightly above that to be impregnated in the catalyst or not at all since only a small percentage or none of the salt or salts is lost when the solvent is removed.

While various techniques can be utilized for activating the catalyst, the activation is preferably carried out by calcining the catalyst in an atmosphere containing oxygen, usually dry air. Typically, the activation of the catalyst comprises heating the metal salt impregnated catalyst in air at a temperature in the range of from about 400° C. to about 900° C., preferably from about 400° C. to about 700° C., for a time period of from about 1 hour to about 10 hours.

The activated metal salt impregnated catalyst can be subjected to at least partial reduction of the hexavalent chromium to a lower valent state by contacting the catalyst with a reducing agent. As will be described hereinbelow, such reduction is beneficial when a cocatalyst is combined with the impregnated catalyst.

The treated catalysts of the present invention, with or without cocatalysts, can be employed in various olefin polymerization processes wherein at least one olefin monomer having from 2 to about 8 carbon atoms is contacted with a treated supported chromium oxide catalyst of the present invention under polymerization conditions. The reaction medium can be a dry inert hydrocarbon such as isobutane, n-heptane, methylcyclohexane or benzene at a reactor temperature within the range of from about 60° C. to about 110° C. and a reactor pressure of from about 250 psig to about 600 psig. The polymer produced can be recovered, treated with carbon dioxide or water, for example, to deactivate residual catalysts, stabilized with an antioxident such as butylated hydroxy toluene (BHT), and dried by conventional methods to obtain the final product. Hydrogen can be used in the reactor as known in the art to provide some control of the molecular weight of the polymer.

In a preferred polymerization process wherein a copolymer is produced, the metal salt impregnated catalyst is reduced by high temperature contact with a reducing agent, preferably carbon monoxide, then combined with a cocatalyst and used to polymerize comonomers, e.g., ethylene and hexene. The polymerization reaction is conducted in the presence of hydrogen to produce copolymers of low density and to bring about high comonomer incorporation efficiency. If a reducing agent other than carbon monoxide is used, higher amounts of comonomer are needed in the reaction zone to achieve similar amounts of comonomer incorporation into the resultant copolymer. Generally, the calcined catalyst is directly subjected to the reducing agent at a high temperature although intervening steps may be employed if desired.

When carbon monoxide is utilized, it can be employed at temperatures between about 300° C. to about 500° C. although it is preferably employed at temperatures in the range of about 350° C. to about 450° C. for best chromium reduction. The partial pressure of the reducing gas in the reduction operation can be varied from subatmospheric pressures to relatively high pressures, but the simplest reducing operation is to utilize essentially pure carbon monoxide at about atmospheric pressure.

The reduction time can vary from a few minutes to several hours or more. The extent of reduction can be followed by visual inspection of catalyst color. The color of the initial activated catalyst is generally orange, indicating the presence of hexavalent chromium. The color of reduced catalyst is blue, indicating that all or substantially all of the initial hexavalent chromium has been reduced to lower oxidation states, generally the divalent state.

The course of the reduction of the air-activated orange catalyst with carbon monoxide can be determined exactly by pulse titration. A known amount of carbon monoxide is added per pulse and the amount of evolved carbon dioxide is measured. When reduction is complete only carbon monoxide will be present and the catalyst will be blue in color. The reduced blue catalyst can be titrated with pulses of oxygen to convert the catalyst to the original orange color. When oxidation is complete, oxygen will be evident in the offgas.

After reduction, the reduced supported catalyst component is cooled to about room temperature, e.g., about 25° C., in an inert atmosphere such as argon or nitrogen to flush out the carbon monoxide. After this flushing treatment the catalyst is kept away from contact with either carbon monoxide or oxygen.

The cocatalyst utilized is preferably a trialkyl aluminum compound wherein the alkyl groups have from about 1 to about 10 carbon atoms, preferably about 2 to about 4 carbon atoms. Trialkyl aluminum compounds are preferred for use as cocatalysts because they are effective in improving polymer properties, such as, for example, suppressing polymer density during polymerization. The most preferred cocatalyst is triethyl aluminum.

The trialkyl aluminum cocatalyst is used in an amount within the range of about 0.5 to about 4 parts per million (ppm), or milligrams per kilogram (mg/kg), based on the amount of diluent in the reactor. Preferably, the cocatalyst is used in an amount within the range of about 0.5 to about 3 ppm, and most preferably, within the range of about 1 to about 2 ppm, for cost effectiveness and best polymer properties.

Relatively high levels of hydrogen are used in the polymerization process with the above described reduced catalyst and cocatalyst to achieve high comonomer incorporation efficiency. Preferably, the hydrogen is present in an amount in the range of from 1 mole % to about 2 mole % based on the total moles of comonomers used.

In order to further illustrate the preparation and use of the preferred catalysts of the present invention, the following examples are given. The particular components and catalysts utilized in the examples are meant to be illustrative of the present invention and not limiting thereto.

EXAMPLE 1

Test portions of catalyst of the type described in U.S. Pat. No. 3,875,079 to Witt comprised of 2% chromium oxide supported on a silica-titania (2.5% Ti) support purified to reduce occluded alkali metal salt and calcined at 400° C.–500° C. were impregnated with various quantities of sodium formate. The catalyst had a pore volume of about 2.5 cc/g and a surface area of about 550 M²/g. The impregnations were carried out by combining methanol solutions of sodium formate with the catalyst portions, stirring the resultant mixtures for about 30 minutes and then removing the methanol by evaporation. The salt impregnated catalyst test portions were reactivated by heating in air at a temperature of 650° C. for 5 hours.

Each of the impregnated catalyst test portions were used in ethylene homopolymer polymerization reactions carried out in isobutane solutions at 109° C. and 550 psig. The polymer from each polymerization was recovered and tested for melt index in accordance with ASTM 1238-65T, condition E. The activity of the catalyst in each polymerization was also determined.

The results of these tests are given in Table I below.

TABLE I

| Catalyst[1] | Polymerization Conditions[3] | | | |
|---|---|---|---|---|
| Quantity of Sodium[2], micromoles Na/g | Induction Period, Min. | Run Time, Min. | Activity, g/g - hr. | Polymer Melt Index[4] |
| 0 | 30 | 72 | 3620 | 0.7 |
| 0 | 30 | 64 | 3950 | 0.6 |
| 65 | 20 | 45 | 5690 | 1.4 |
| 87 | 20 | 53 | 5110 | 2.0 |
| 109 | 20 | 65 | 4320 | 2.1 |
| 217 | 20 | 54 | 4980 | 2.5 |
| 326 | 45 | 130 | 1870 | 1.6 |
| 434 | 30 | 190 | 1240 | 1.4 |

[1]The catalyst was chromium oxide on a silica-titania support (1% Cr; 2.5% Ti) prepared in accordance with U.S. Pat. No. 3,875,079 to Witt.
[2]Micromoles of sodium impregnated into catalyst prior to activation as sodium formate per gram of catalyst.
[3]Polymerization carried out in isobutane at 109° C. and 550 psig.
[4]Determined in accordance with ASTM 1238-65T, condition E.

From Table I it can be seen that the activity and polymer melt index are appreciably increased when a catalyst of the present invention is utilized.

EXAMPLE 2

The procedure described in Example 1 is repeated except that lithium formate was used for preparing the catalyst in lieu of sodium formate. The results of these tests are given in Table II below.

TABLE II

| Catalyst[1] | Polymerization Conditions[3] | | | |
|---|---|---|---|---|
| Quantity of Lithium[2], micromoles Li/g | Induction Period, Min. | Run Time, Min. | Activity, g/g - hr. | Polymer Melt Index[4] |
| 0 | 30 | 64 | 3950 | 0.6 |
| 65 | 20 | 45 | 5230 | 2.2 |
| 86 | 15 | 52 | 5000 | 2.4 |
| 108 | 15 | 55 | 5080 | 2.3 |
| 216 | 15 | 47 | 4810 | 3.5 |
| 324 | 15 | 60 | 4040 | 2.6 |

[1]The catalyst was chromium oxide on a silica-titania support (1% Cr; 2.5% Ti) prepared in accordance with U.S. Pat. No. 3,875,079 to Witt.
[2]Micromoles of lithium impregnated into catalyst prior to activation as lithium formate per gram of catalyst.
[3]Polymerization carried out in isobutane at 109° C. and 550 psig.
[4]Determined in accordance with ASTM 1238-65T, condition E.

From Table II it can be seen that the catalysts treated with lithium formate resulted in appreciable increases in activity and polymer melt index as compared to untreated catalyst.

EXAMPLE 3

The procedure of Example 1 was repeated except that various alkali and alkaline earth metal salts were utilized. The results of these tests are given in Table III below.

TABLE III

| Catalyst[1] | | Polymerization Conditions[3] | | | Polymer |
|---|---|---|---|---|---|
| Salt Used | Quantity[2], micromoles/g | Induction Period, Min. | Run Time, Min. | Activity, g/g - hr. | Melt Index[4] |
| Li Acetate | 216 | 20 | 50 | 4970 | 2.5 |
| Li NO$_3$ | 216 | 40 | 100 | 2600 | 2.5 |
| Li OH | 217 | 20 | 50 | 5240 | 3.0 |
| Li OH | 109 | 20 | 46 | 4970 | 3.0 |
| Li OH | 360 | 15 | 47 | 4990 | 3.0 |
| Na ClO$_3$ | 217 | 15 | 58 | 4570 | 3.2 |
| KOH | 109 | 50 | 90 | 3250 | 1.3 |
| K Formate | 217 | 30 | 120 | 2030 | 1.7 |
| Ca Cl$_2$ | 109 | 15 | 58 | 3730 | 1.1 |
| Ca NO$_3$ | 109 | 10 | 53 | 5030 | 0.8 |
| Ca NO$_3$ | 217 | 14 | 52 | 4740 | 0.7 |
| Mg Acetate | 109 | 20 | 60 | 3860 | 0.7 |
| Mg Formate | 217 | 15 | 62 | 4000 | 0.8 |
| Mg Nitrate | 109 | 11 | 49 | 5690 | 1.6 |

[1]The catalyst was chromium oxide on a silica-titania support (1% Cr; 2.5% Ti) prepared in accordance with U.S. Pat. No. 3,875,079 to Witt.
[2]Micromoles of salt impregnated into catalyst prior to activation per gram of catalyst.
[3]Polymerization carried out in isobutane at 109° C. and 550 psig.
[4]Determined in accordance with ASTM 1238-65T, condition E.

The data presented in Table III illustrates that various alkali metal and alkaline earth metal salts can be utilized in accordance with the present invention.

EXAMPLE 4

The procedure of Example 1 was repeated except that ethylene-hexene copolymerization reactions were carried out. The results of these tests are given in Table IV below.

TABLE IV

| Catalyst[1] Quantity of Sodium[2] micromoles Na/g | Copolymerization Conditions[3] | | | | | Polymer Melt Index[4] |
|---|---|---|---|---|---|---|
| | Induction Period, Min. | Run Time, Min. | Wt. % Hexene in Feed | Activity, g/g - hr. | Polymer Density | |
| 0 | — | — | 2.9 | 4710 | 0.9376 | 0.21 |
| 26 | 15 | 43 | 3.2 | 6940 | 0.9400 | 0.43 |
| 39 | 25 | 33 | 3.1 | 5240 | 0.9412 | 0.58 |
| 52 | 10 | 40 | 3.0 | 5920 | 0.9365 | 0.79 |
| 65 | 20 | 40 | 2.9 | 6300 | 0.9369 | 0.90 |

[1]The catalyst was chromium oxide on a silica support prepared in accordance with U.S. Pat. No. 3,875,079 to Witt.
[2]Micromoles of sodium impregnated into catalyst prior to activation as sodium formate per gram of catalyst.
[3]Polymerization carried out in isobutane at 94° C. and 475 psig.
[4]Determined in accordance with ASTM 1238-65T, condition E.

From Table IV it can be seen that the copolymer melt indexes are increased when catalysts of the present invention are utilized.

EXAMPLE 5

Test portions of activated catalysts of the type described in U.S. Pat. No. 4,364,842 to McDaniel et al. comprised of chromium oxide supported on an aluminophosphate support (the mole ratio of phosphate to alumino in the support =0.4) were impregnated with various quantities of lithium formate and sodium formate. The impregnations were carried out by combining methanol solutions of the lithium and sodium formate salts with the catalyst portions, stirring the resultant mixtures for 30 minutes and then removing the methanol by evaporation. The salt impregnated catalyst test portions were reactivated by heating in air at a temperature of 600° C. for 3 hours.

Each of the impregnated catalyst test portions along with triethylborane co-catalyst were used in ethylene homopolymer polymerization reactions carried out in isobutane solutions at 95° C. and 550 psig. The polymer from each polymerization was recovered and tested for high load melt index in accordance with ASTM 1238-65T, condition F. The activity of the catalyst in each polymerization was also determined. The results of these tests are given in Table V below.

TABLE V

| Salt Used to Impregnate Catalyst | Catalyst[1] Quantity of Salt[2] micromoles/g | Quantity of Catalyst Used in Polymerization, g | Cocatalyst[3] Quantity, ppm. | Polymerization Conditions[4] | | Polymer High Load Melt Index[5] |
|---|---|---|---|---|---|---|
| | | | | Run Time, min. | Activity, g/g - hr. | |
| — | 0 | 0.0474 | 8 | 30 | 4325 | 4.3 |
| Li Formate | 53 | 0.0745 | 8 | 30 | 6550 | 8.2 |
| Li Formate | 53 | 0.0533 | 8 | 30 | 4600 | 5.6 |
| Li Formate | 108 | 0.0523 | 8 | 30 | 5180 | 8.3 |
| Li Formate | 217 | 0.0363 | 8 | 30 | 2700 | 19.7 |
| Na Formate | 217 | 0.0379 | 8 | 30 | 4540 | 17.6 |

[1]The catalyst was chromium oxide supported on aluminum phosphate (P/Al = 0.4)
[2]Micromoles of metal salt impregnated into catalyst prior to activation.
[3]Cocatalyst was triethylborane
[4]Polymerization carried out in isobutane at 95° C. and 550 psig.
[5]Determined in accordance with ASTM 1238-G5T, condition F.

From Table V it can be seen that the catalysts of the present invention bring about significant increases in polymer high load melt indexes.

to determine density, MI, HLMI and other properties as shown in Table VI below.

TABLE VI

| Run No. | Catalyst | Reduced With CO | H$_2$, mole % | TEA, ppm. | TEB, ppm. | C$_6$H$_{12}$, wt. % | MI | HLMI | HLMI/ MI | Density | Productivity g Product/ g Catalyst | Description |
| --- | --- | --- | --- | --- | --- | --- | --- | --- | --- | --- | --- | --- |
| 2 | C | Yes | 1.0 | 2.5 | 0 | 16.8 | .04 | 9.1 | 202 | .9312 | 2630 | Invention |
| 3 | C | Yes | 1.8 | 2.5 | 0 | 17.5 | .09 | 13.4 | 151 | .9235 | 2941 | Invention |
| 4 | C | Yes | 1.8 | 0 | 1.0 | 16.8 | .19 | 27.5 | 145 | .9325 | 2941 | Invention |
| 5 | C | Yes | 1.0 | 0 | 1.0 | 18.8 | .19 | 27.9 | 149 | .9327 | 2703 | Invention |
| 6 | A | Yes | 1.0 | 0 | 1.0 | 14.5 | .09 | 10.8 | 119 | .9323 | 2128 | Control |
| 7 | A | Yes | 1.0 | 0 | 1.0 | 14.7 | .11 | 11.9 | 110 | .9257 | 2083 | Control |
| 8 | B | No | 1.0 | 0 | 1.0 | 16.7 | .13 | 20.9 | 166 | .9379 | 3125 | Invention |
| 9 | B | No | 1.0 | 0 | 1.0 | 20.8 | .22 | 30.4 | 139 | .9329 | 2857 | Invention |
| 10 | B | No | 1.0 | 0 | 1.0 | 23.3 | .26 | 36.0 | 138 | .9312 | 2439 | Invention |
| 11 | B | No | 1.8 | 0 | 1.0 | 23.9 | .40 | 50.0 | 124 | .9234 | 2632 | Invention |
| 12 | B | No | 2.0 | 0 | 0 | 20.2 | .24 | 25.2 | 103 | .9239 | 1980 | Invention |
| 13 | B | No | 1.0 | 1.7 | 0 | 17.1 | .12 | 15.5 | 129 | .9290 | 2778 | Invention |
| 14 | B | No | 1.0 | 2.0 | 0 | 17.3 | .04 | 8.5 | 213 | .9324 | 3571 | Invention |

EXAMPLE 6

Ethylene-hexene copolymers were prepared in a continuous particle form process by contacting the catalyst with the monomers in a liquid full loop reactor having a volume of 23 gallons (87 liters). Isobutane was used as the diluent, and occasionally, hydrogen was introduced into the reactor. The reactor temperature was set at 82° C. and the pressure was 4 Mpa (580 psig). At steady state conditions, the isobutane feed rate was 46 l/hr, the ethylene feed rate was about 30 lbs/hr, and the hexene feed rate was varied to control the density of the product polymer. Polymer was removed from the reactor at the rate of 25 lbs/hr.

The tests were conducted according to the following procedures:

Density (g/ml): ASTM D 1505-68 and ASTM D 1928, Condition C. Determined on a compression molded sample, cooled at about 15 degrees C. per minute, and conditioned at room temperature for about 40 minutes. Melt Index (MI): ASTM 1238-65T, Condition E. High Load Melt Index (HLMI): ASTM 1238-65T, Condition F.

Three catalysts were prepared from a silica-titania supported chromium catalyst which contained 5 weight % titanium and 1 weight % chromium. The basic catalyst had a pore volume of about 2.5 cc/g and a surface area of about 500 square meters per gram. The catalysts are described hereinbelow. Catalyst A was used as a control catalyst.

Catalyst A: Activated in dry air for 6 hours; cooled to 370° C. in nitrogen; treated with 10% carbon monoxide/90% nitrogen at 370° C. for 2 hours; cooled in nitrogen flush to 150° C. over 6 hours to remove CO.

Catalyst B: 600 g of catalyst was mixed with a methanol solution of sodium formate, then dried in a vacuum oven overnight at 80° C., leaving 200 micromoles of sodium per gram of catalyst. It was then activated in dry air at 650° C. for SIX hours.

Catalyst C: After activation, Catalyst B was reduced by exposure to 10% carbon monoxide/90% nitrogen at 370° C. For 2 hours. It was then flushed with nitrogen down to 150° C. over 6 hours to remove excess carbon monoxide.

The above catalysts were utilized in the continuous loop reactor described above to prepare the ethylene-hexene copolymers. The copolymers were then tested A comparison of runs 5, 8, 9 and 10 to control runs 6 and 7, which were made under similar conditions (1% hydrogen, 1 ppm triethylboron, TEB), shows that the sodium-treated catalysts have higher MI potential and better activity than the control catalysts. The invention catalysts yield a broader molecular weight distribution as indicated by the higher HLMI/MI ratios.

The CO reduction treatment usually improves the incorporation efficiency of Cr/silica catalysts. That is, less hexene is needed to suppress the density of the resin product. This can be seen by comparing runs 5 vs. 8-10 and 2 vs. 14, made under the same reactor conditions.

In the presence of triethylboron (TEB), CO-reduced catalysts usually display decreased resin density. Triethylaluminum (TEA) usually has little or no effect. However, it is seen in Table VI that the sodium-treated catalysts behave altogether differently. By comparing run 12 (no cocatalyst) with run 11 (TEB added) it can be seen that in the presence of TEB, it actually takes more hexene to suppress the density to a similar level. Comparing run 3 (TEA) to run 4 (TEB), both made at 1.8 mole % hydrogen, or run 2 (TEA) to run 5 (TEB), both made at 1 mole % hydrogen, we see that TEA is more effective than TEB at density suppression for the invention catalysts.

The most surprising benefit seen in the pilot plant experiments is the sensitivity of the invention catalysts to hydrogen. The main influence of hydrogen on the sodium-treated catalysts is not on the melt index, as is usually found, but on the resin density and hexene incorporation efficiency. In the presence of TEA the density drops from 0.9312 to a low 0.9235 as the hydrogen was raised from 1% to 1.8% in runs 2 and 3. In runs 4 and 5, the same experiment was run except that the cocatalyst was TEB rather than TEA. Here there was no change in density as hydrogen was raised. In fact it took slightly more hexene to make the same density. Comparing runs 2 to 14 shows that the CO reduction step also contributes slightly to the sensitivity. Thus, the combination of TEA, hydrogen, and the invention catalyst, preferably CO reduced, results in special benefits. Run 3 can be considered the optimum, combining the catalyst of the invent ion, CO reduction, TEA cocatalyst, and high levels of hydrogen in the reactor. Little hexene is needed compared to other runs to make the low 0.9235 density resin. Also the productivity is about 50% better than the untreated catalyst.

Another series of runs were made with catalyst C as shown in Table VII.

TABLE VII

| Run No. | $H_2$, Mole % | TEA, ppm. | HLMI | Density | Wt. % $C_6H_{12}$ |
|---|---|---|---|---|---|
| 15 | 0 | 0 | 3 | .940 | 14 |
| 16 | 0 | 2 | 3.5 | .933 | 15 |
| 17 | 1.0 | 2 | 11 | .931 | 18 |
| 18 | 1.5 | 2 | 13 | .924 | 17 |
| 19 | 2.0 | 2 | 14 | .923 | 17 |
| 20 | 2.0 | TEB 1 | 30 | .933 | 17 |

The presence of TEA greatly lowers the density compared to no co-catalyst (run 15 vs. 16) or to TEB (run 19 vs. 20). As shown graphically in the drawing, in the presence of TEA (runs 16–19) the density drops precipitously as hydrogen is added to the reactor. Thus, run 19 can be considered as the optimum, including sodium salt treatment, CO reduction, TEA cocatalyst, and high levels of hydrogen in the reactor. Little hexene is needed in the reactor to suppress the density to the low value of 0.9235.

The present invention, therefore, is well adapted to carry out the objects and attain the ends and advantages mentioned as well as those which are inherent therein. While numerous changes in the processes for preparing and using the catalysts of this invention may be made by those skilled in the art, such changes are encompassed within the spirit of this invention as defined by the appended claims.

We claim:

1. In a process wherein at least one olefin monomer having from 2 to about 8 carbon atoms is contacted under polymerization conditions with a catalyst to produce a polymer, said catalyst being comprised of chromium oxide and a support containing one or more of silica, titania, thoria, alumina, zirconia or aluminophosphates, the improvement which comprises prior to effecting said contact:

purifying said catalyst support to remove residual alkali metal and alkaline earth metal salts therefrom;

impregnating said catalyst after its formation with a metal salt selected from the group consisting of alkali metal salts, alkaline earth metal salts and mixtures thereof in an amount in the range of from about 50 to about 500 micromoles of metal salt per gram of catalyst to improve the catalytic properties of said catalyst by mixing said catalyst with a non-aqueous solution of said salt and then removing the non-aqueous solvent from said mixture; and activating said salt-impregnated catalyst.

2. The process of claim 1 wherein said activating step comprises calcining said salt-impregnated catalyst in air at a temperature in the range of from about 400° C. to about 900° C.

3. The process of claim 1 wherein said salt is an alkali metal salt and said non-aqueous solvent is an alcohol which is removed by evaporation.

4. The process of claim 1 wherein said activating step comprises heating said salt-impregnated catalyst in air at a temperature in the range of from about 400° C. to about 600° C. for a time period of from about 1 hour to about 10 hours.

5. In a process wherein at least one olefin monomer having from 2 to about 8 carbon atoms is contacted under polymerization conditions with a catalyst to produce a polymer, said catalyst being comprised of chromium oxide and a support containing one or more of silica, titania, thoria, alumina, zirconia or aluminophosphates, the improvement which comprises prior to effecting said contact:

purifying said catalyst support to remove residual alkali metal and alkaline earth metal salts therefrom;

impregnating said catalyst after its formation with a metal salt selected from the group consisting of alkali metal salts, alkaline earth metal salts and mixtures thereof in an amount in the range of from about 50 to about 500 micromoles of metal salt per gram of catalyst to improve the catalytic properties of said catalyst; and activating said salt-impregnated catalyst.

6. The process of claim 5 wherein said impregnating step comprises mixing said catalyst with a non-aqueous solution of said salt and then removing the non-aqueous solvent from said mixture.

7. The process of claim 6 wherein said activating step comprises calcining said salt-impregnated catalyst in air at a temperature in the range of from about 400° C. to about 900° C.

8. The process of claim 6 wherein said salt is an alkali metal salt and said non-aqueous solvent is an alcohol which is removed by evaporation.

9. The process of claim 6 wherein said activating step comprises heating said salt-impregnated catalyst in air at a temperature in the range of from about 400° C. to about 600° C. for a time period of from about 1 hour to about 10 hours.

10. The process of claim 5 which is further characterized to include the step of contacting said activated salt-impregnated catalyst with a reducing agent to at least partially reduce the chromium in said catalyst to a lower valance state.

11. The process of claim 10 wherein said reducing agent carbon monoxide and said contact is carried out at a temperature in the range of from about 300° C. to about 500° C.

12. The process of claim 11 which is further characterized to include the step of combining a cocatalyst with said salt-impregnated catalyst.

13. The process of claim 12 wherein said cocatalyst is a trialkyl aluminum compound wherein the alkyl groups have from 1 to 10 carbon atoms.

14. The process of claim 13 wherein said cocatalyst is triethyl aluminum.

15. The process of claim 13 wherein said polymerization is carried out in the presence of hydrogen.

16. The process of claim 15 wherein said hydrogen is present in the range of from about 1 mole % to about 2 mole % based on the total moles of olefin monomer reacted.

* * * * *